United States Patent
Raghuraman et al.

(10) Patent No.: US 10,435,502 B2
(45) Date of Patent: Oct. 8, 2019

(54) POLYETHER-ACETAL POLYOL COMPOSITIONS

(71) Applicant: Dow Global Technologies LLC, Midland, MI (US)

(72) Inventors: Arjun Raghuraman, Freeport, TX (US); William L. Heaner, Freeport, TX (US); David A. Babb, Freeport, TX (US); Manjiri R. Paradkar, Freeport, TX (US)

(73) Assignee: Dow Global Technologies LLC, Midland, MI (US)

( * ) Notice: Subject to any disclaimer, the term of this patent is extended or adjusted under 35 U.S.C. 154(b) by 53 days.

(21) Appl. No.: 15/542,323

(22) PCT Filed: Jan. 8, 2016

(86) PCT No.: PCT/US2016/012624
§ 371 (c)(1),
(2) Date: Jul. 7, 2017

(87) PCT Pub. No.: WO2016/112274
PCT Pub. Date: Jul. 14, 2016

(65) Prior Publication Data
US 2018/0273676 A1    Sep. 27, 2018

Related U.S. Application Data

(60) Provisional application No. 62/101,001, filed on Jan. 8, 2015.

(51) Int. Cl.
*C08G 18/48* (2006.01)
*C08G 18/56* (2006.01)
(Continued)

(52) U.S. Cl.
CPC ........... *C08G 18/56* (2013.01); *C08G 18/161* (2013.01); *C08G 18/168* (2013.01);
(Continued)

(58) Field of Classification Search
CPC ................ C08G 18/16; C08G 18/76
(Continued)

(56) References Cited

U.S. PATENT DOCUMENTS 3,395,129 A   7/1968   Dieterich et al.
9,534,090 B2  1/2017   Müller et al.
(Continued)

FOREIGN PATENT DOCUMENTS

GB    1164997    9/1969

OTHER PUBLICATIONS

International Preliminary Report on Patentability for related PCT Application PCT/US2016/012624, dated Jul. 20, 2017 (12 pgs).
(Continued)

*Primary Examiner* — Duc Truong
(74) *Attorney, Agent, or Firm* — Brooks, Cameron & Huebsch, PLLC

(57) ABSTRACT

Embodiments of the present disclosure are directed to polyether-acetal polyol compositions, more particularly to polyol compositions including a polyether-acetal polyol that can be utilized to form polyurethanes. As an example, a polyurethane formulation can include a polyol composition including a polyether-acetal polyol functionalized with at least one acetal functional group, where the polyol composition has an average hydroxyl functionality from 2 to 8 and a hydroxyl equivalent weight from 150 to 4000, where the portion of the polyether-acetal polyol that is functionalized with the at least one acetal functional group is 1 percent to 40 percent of a total weight of the polyether-acetal polyol, where the polyether-acetal polyol has a primary hydroxyl
(Continued)

group content of at least 55 percent, and a polyisocyanate, where the polyurethane formulation has an isocyanate index in a range from 70 to 500.

9 Claims, 2 Drawing Sheets

(51) Int. Cl.
 *C08G 18/76* (2006.01)
 *C08G 18/16* (2006.01)
 *C08G 18/22* (2006.01)
(52) U.S. Cl.
 CPC ....... *C08G 18/222* (2013.01); *C08G 18/4825* (2013.01); *C08G 18/4829* (2013.01); *C08G 18/4866* (2013.01); *C08G 18/7664* (2013.01)
(58) Field of Classification Search
 USPC .................................................... 528/65, 66
 See application file for complete search history.

(56) References Cited

U.S. PATENT DOCUMENTS

| | | |
|---|---|---|
| 2002/0016395 A1 | 2/2002 | Niino et al. |
| 2015/0368396 A1 | 12/2015 | Müller et al. |

OTHER PUBLICATIONS

International Search Report & Written Opinion for related PCT Application PCT/US2016/012624, dated Apr. 20, 2016 (14 pgs).

POLYETHER-ACETAL POLYOL COMPOSITIONS

This application is a National Stage Application under 35 U.S.C. § 371 of International Application Number PCT/US2016/012624, filed Jan. 8, 2016 and published as WO 2016/112274 on Jul. 14, 2016, which claims the benefit to U.S. Provisional Application 62/101,001, filed Jan. 8, 2015, the entire contents of which are incorporated herein by reference in its entirety.

FIELD

Embodiments relate to polyether-acetal polyol compositions, more particularly, to polyol compositions including a polyether-acetal polyol that can be utilized to form polyurethanes.

BACKGROUND

Polyurethanes may be used in a variety of applications. Depending upon an application, a particular aesthetic quality and/or mechanical performance of polyurethane may be desired. Polyols are used to form polyurethanes. Polyols include polyether polyols and polyester polyols. For example, polyether polyols may be produced by polymerizing an alkylene oxide. The alkylene oxide can react with one or more functional groups of another material in the presence of a catalyst to form polymer chains. Qualities of the one or more functional groups and/or qualities of the catalyst can influence properties such as a molecular weight of a resultant polyether polyol.

As such, with respect to varying properties of polyurethanes depending upon an application thereof, one method is vary a structure and/or a composition of a polyether polyol used in the manufacture of the polyurethane. However, varying a structure and/or a composition of a polyol may have an undesirable impact on other properties (e.g., decreased resiliency and/or a decreased durability) of the resultant polyurethane. Accordingly, a need exists for polyol compositions that promote desired mechanical properties in resultant polyurethanes without undesirably impacting other mechanical properties of the resultant polyurethane.

SUMMARY

As used herein, polyether-acetal polyol compositions refer to polyol compositions including a polyether-acetal polyol. Embodiments may be realized by forming a polyurethane formulation that includes a polyol composition including a polyether-acetal polyol functionalized with at least one acetal functional group, where the polyol composition has an average hydroxyl functionality from 2 to 8 and a hydroxyl equivalent weight from 150 to 4000, where the portion of the polyether-acetal polyol that is functionalized with the at least one acetal functional group is 1 percent to 40 percent of a total weight of the polyether-acetal polyol, where the polyether-acetal polyol has a primary hydroxyl group content of at least 55 percent, and a polyisocyanate, where the polyurethane formulation has an isocyanate index in a range from 70 to 500.

DETAILED DESCRIPTION

Figure 1:
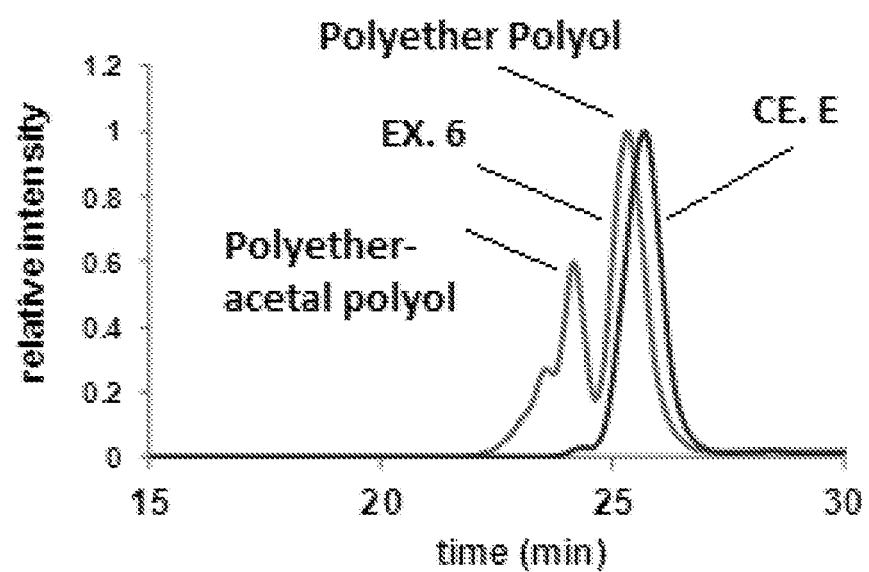
FIG. 1 illustrates Gel Permeation Chromatography (GPC) traces according to the disclosure.

Polyurethanes may be used in a variety of applications. Depending upon an application, a particular aesthetic quality and/or mechanical performance of polyurethane may be desired. Polyols are used to form polyurethanes. Polyols include polyether polyols and polyester polyols. For example, polyether polyols may be produced by polymerizing an alkylene oxide. The alkylene oxide can react with one or more functional groups of another material in the presence of a catalyst to form polymer chains. Qualities of the one or more functional groups and/or qualities of the catalyst can influence properties such as a molecular weight of a resultant polyether polyol.

As such, with respect to varying properties of polyurethanes depending upon an application thereof, one approach is alter a structure and/or a composition of a polyether polyol used in the manufacture of the polyurethane. For example, as discussed in U.S. Pat. No. 8,841,381, use of polycarbonate polyols, particularly aqueous dispersions including the same, may provide resultant polyurethanes having an increased durability as compared to polyurethanes formed from other types of polyols.

Another example of altering a structure and/or a composition of a polyol includes the production of linear polyacetal polymer. Linear polyacetal polymers have been employed in applications related to photoresists in an effort to obtain a change in solubility within a defined region in a photosensitive film as discussed in U.S. Patent Application 2002/0081499 and similarly in targeted delivery to cancerous tissue as discussed in European Patent 2,660,267. Production of the linear polyacetal polymers, as detailed in U.S. Patent Application 2002/0081499 employs addition reactions. As discussed in U.S. Patent Application 2011/0034610 polyacetal containing materials may also be used in applications involving the construction of molded parts in the automotive and electrical industries to provide desired mechanical properties and/or moldability. For example, as shown in Example 1 of U.S. Patent Application 2011/0034610, the synthesis of polyacetals has been usually carried out via direct alcohol-aldehyde condensation reactions or by the acid-catalyzed reaction of vinyl ethers and alcohols. Direct alcohol-aldehyde addition typically involves the use of hazardous and highly toxic materials such as formaldehyde whereas the acid-catalyzed addition of alcohols and vinyl ethers requires lengthy preparation, among other disadvantages. Further, in each of the above approaches, altering a structure and/or a composition of a polyol may have an undesirable impact on other properties. For instance, polymers comprised of purely acetal functional groups may be sensitive to a given pH of an environment where they are employed. Moreover, shifts of pH such as from a relatively neutral pH to a low pH may cause degradation of polymers comprised of purely acetal functional groups. Advantageously, polyurethane polymers prepared from the polyol compositions including polyether-acetal polyols, as detailed herein, appear more tolerant of such changes in pH. Other methods of altering the structure of polyols such as varying a type of catalyst employed during formation of a polyol are therefore desirable.

Double-metal cyanide (DMC) catalyst can be employed during formation of polyols. DMC catalysts are regarded as highly active alkoxylation catalysts that can be used at very low concentrations (e.g., less than 50 ppm based on the total weight of the composition used to form the propoxylated polyether polyol) to achieve rapid alkoxylation of oxides such as propylene oxide (PO) and butylene oxide (BO). For example, as shown in Example 1 of U.S. Pat. No. 6,531,566, used of a sodium hydroxide based alkali metal catalyst leads to a reaction time of twelve hours. However, a twelve hours reaction time may be regarded as unfavorable in a manufacturing setting, and the overall reaction time can be reduced by the use of a DMC catalyst. As discussed in International Publication No. WO 2012/091968, certain Lewis acids that essentially require no activation time have been evaluated as polymerization catalysts. However, the Lewis acids may become deactivated rapidly and may not be capable of producing high molecular weight polymers or of obtaining high conversions of alkylene oxides to polymer. Acid based catalysts, such as sodium hydroxide and Lewis acids, have a further disadvantage in that treatment such as filtration and/or acid finishing/neutralization (e.g., as discussed in U.S. Pat. No. 5,468,839) may be required to reduce the acid content of the resultant product. Notably, the use of DMC catalyst and/or a sufficiently low amount of acid based catalysts (such as Lewis acids) may eliminate the need for such treatment.

In various embodiments herein, a sequential method for forming polyol composition including a polyether-acetal polyol (such as a PO based polyol) using both a DMC catalyst and a boron-based Lewis acid catalyst in a low amount such that filtration and acid finishing/neutralization are not required for the resultant polyol composition including a polyether-acetal polyol. Notably, the resultant polyol composition including a polyether-acetal polyol, when admixed with an isocyanate and allowed to cure, forms polyurethanes having desired mechanical properties (e.g., high modulus) without undesirably impacting other mechanical properties of the polyurethane. However, the present disclosure is not so limited. That is various embodiments herein employ a direct method for forming polyol composition including a polyether-acetal polyol using only a boron-based Lewis acid catalyst (without employing a DMC catalyst).

The resultant polyol compositions including a polyether-acetal polyol produced by either the sequential or direct method desirably have at least some acetal content due at least in part to epoxide isomerization of aldehydes in the presence of the Lewis-acid catalyst, as detailed herein. The acetal content refers to a portion of the polyether-acetal polyol that is functionalized with the at least one acetal functional group. Embodiments of the present disclosure provide that a portion of a polyether-acetal polyol that is functionalized with at least one acetal functional group is 1 percent to 40 percent of a total weight of the polyether-acetal polyol. All individual values and subranges from 1 weight percent (wt %) to 40 wt % of a total weight of the polyether-acetal polyol are included; for example, the portion of the polyether-acetal polyol that is functionalized with at least one acetal functional group can have from a lower limit of 1 wt %, 6 wt %, 10 wt % or 23 wt % to an upper limit of 40 wt %, 37 wt %, or 29 wt % of the total weight of the polyether-acetal polyol.

The polyether-acetal polyol is from 1 percent to 100 percent of the total weight of the polyol composition. All individual values and subranges from 1 percent to 100 wt % of percent of a total weight of the polyol composition are included; for example, the polyether-acetal polyol can have from a lower limit of 1 wt %, 10 wt %, 20 wt % or 40 wt % to an upper limit of 100 wt %, 90 wt %, or 75 wt % of the total weight of the polyol composition.

The polyol composition has an average hydroxyl functionality from 2 to 8. All individual values and subranges from 2 to 8 average hydroxyl functionality of the polyol composition are included; for example, the polyol composition can have from a lower limit of 2 average hydroxyl functionality, 2 average hydroxyl functionality, 3 average hydroxyl functionality or 4 average hydroxyl functionality to an upper limit of 8 average hydroxyl functionality, 7 average hydroxyl functionality, 6 average hydroxyl functionality, or 5 average hydroxyl functionality of the polyol composition.

The polyol composition has a hydroxyl equivalent weight from 150 to 4000. All individual values and subranges from 150 to 4000 hydroxyl equivalent weight of the polyol composition are included; for example, the polyol composition can have from a lower limit of 150 hydroxyl equivalent weight, 300 hydroxyl equivalent weight, 1000 hydroxyl equivalent weight or 2000 hydroxyl equivalent weight to an upper limit of 4000 hydroxyl equivalent weight, 3500 hydroxyl equivalent weight, 3000 hydroxyl equivalent weight, or 2500 hydroxyl equivalent weight of the polyol composition.

Typical conditions under which DMC-catalyzed propoxylations are carried out using an alkylene oxide (e.g., using PO and excluding the use of any BO) may result in polyols with a high degree of secondary hydroxyl groups (e.g., greater than 90%). This result is characteristic of the use of DMC catalysts. Further, as discussed in International Publication No. WO 2012/09196, poly(PO) polymers produced by Lewis acid catalysis tend to have approximately 50% secondary hydroxyls and 50% primary hydroxyls. However, in addition to having an acetal content, as discussed above, a higher primary hydroxyl group content (i.e., of at least 55%) of the polyether-acetal polymer is sought. By primary hydroxyl group it is meant a terminally located hydroxyl-containing group (e.g., on a polyoxyalkylene polyol such as a polyoxypropylene polyol) and by secondary hydroxyl group it is meant a non-terminally located hydroxyl containing group (e.g., on the polyoxyalkylene polyol such as a polyoxypropylene polyol). In some embodiments, the polyether-acetal polyol can have a primary hydroxyl group content of at least 60%.

Embodiments herein relate to forming a polyol composition including a polyether-acetal polyol (e.g., a PO based polyol) using either a direct method or a sequential method. In either case, the polyether acetal polyol has an acetal content, as discussed above, and a high primary hydroxyl group content (i.e., greater than 55%) and a relatively high Mn (i.e., greater than 2,000 g/mol such as from 2,100 g/mol to 12,000 g/mol, 3,000 g/mol to 5,000 g/mol, etc.).

The direct method utilizes a Lewis acid catalyst without use of a DMC catalyst. For instance, the direct method includes adding the Lewis acid catalyst (without initially adding a DMC catalyst) to a reaction mixture including the polyol that is allowed to react at a second temperature that is lower than a first temperature in which the reaction mixture is initially formed.

The sequential method utilizes a DMC catalyst and a Lewis acid catalyst. For instance, the sequential method includes initially adding a DMC catalyst and later adding the Lewis acid catalyst that is separately provided and allowed to react at a lower temperature than the temperature at which the DMC catalyst was added.

DMC Catalyst

Exemplary double metal cyanide catalysts are discussed in International Publication No. WO 2012/09196. The DMC catalyst, for example, ones that are known in the art, may be used in the sequential method. In particular, the DMC catalyst is the first catalyst that is provided as part of sequential method in which at least a first catalyst and second catalyst after the first catalyst is provided.

For example, the DMC catalysts may be represented by the Formula 1:

$$M_b[M^1(CN)_r(X)_t]_c[M^2(X)_6]_d \cdot nM^3_xA_y \quad \text{(Formula 1)}$$

wherein M and $M^3$ are each metals; $M^1$ is a transition metal different from M, each X represents a group other than cyanide that coordinates with the $M^1$ ion; $M^2$ is a transition metal; A represents an anion; b, c and d are numbers that reflect an electrostatically neutral complex; r is from 4 to 6; t is from 0 to 2; x and y are integers that balance the charges in the metal salt $M^3_xA_y$, and n is zero or a positive integer. The foregoing formula does not reflect the presence of neutral complexing agents such as t-butanol which are often present in the DMC catalyst complex. M and $M^3$ are each a metal ion independently selected from the group of $Zn^{+2}$, $Fe^{+2}$, $Co^{+2}$, $Ni^{+2}$, $Mo^{+4}$, $Mo^{+6}$, $Al^{+3}$, $V^{+4}$, $V^{+5}$, $Sr^{+2}$, $W^{+4}$, $W^{+6}$, $Mn^{+2}$, $Sn^{+2}$, $Sn^{+4}$, $Pb^{+2}$, $Cu^{+2}$, $La^{+3}$ and $Cr^{+3}$, with $Zn^{+2}$ being preferred. $M^1$ and $M^2$ are each independently selected from the group of $Fe^{+3}$, $Fe^{+2}$, $Co^{+3}$, $Co^{+2}$, $Cr^{+2}$, $Cr^{+3}$, $Mn^{+2}$, $Mn^{+3}$, $Ir^{+3}$, $Ni^{+2}$, $Rh^{+3}$, $Ru^{+2}$, $V^{+4}$, $V^{+5}$, $Ni^{2+}$, $Pd^{2+}$, and $Pt^{2+}$. According to exemplary embodiments, those in the plus-three oxidation state are more used as the $M^1$ and $M^2$ metal. For example, $Co^{+3}$ and/or $Fe^{+3}$ may be used.

Exemplary anions can include but are not limited to halides such as chloride, bromide and iodide, nitrate, sulfate, carbonate, cyanide, oxalate, thiocyanate, isocyanate, perchlorate, isothiocyanate, an alkanesulfonate such as methanesulfonate, an arylenesulfonate such as p-toluenesulfonate, trifluoromethanesulfonate (triflate), and a $C_{1-4}$ carboxylate. For example, the chloride ion may be used. r is 4, 5 or 6 (e.g., 4 or 6, or 6); t is 0 or 1. In exemplary embodiments, r+t will equal six.

In one or more embodiments, the DMC catalyst is a zinc hexacyanocobaltate catalyst complex. The DMC catalyst may be complexed with t-butanol. The DMC catalyst used in various embodiments may be a blend catalyst that includes one or more DMC catalysts. The blend catalyst may optionally include a non-DMC catalyst, in which the DMC catalysts account for at least 75 wt % of the total weight of the blend catalyst. The blend catalyst may exclude any of the Lewis acid catalyst that is added at a later time in the sequential method.

Lewis Acid Catalyst

The metal based Lewis acid catalyst has the general formula $M(R^5)_1(R^6)_1(R^7)_1(R^8)_a$, where a is 0 or 1, whereas M is boron, aluminum, indium, bismuth or erbium, $R^5$ and $R^6$ each independently includes a fluoro-substituted phenyl or methyl group, $R^7$ includes a fluoro-substituted phenyl or methyl group or a functional group or functional polymer group, optional $R^8$ is a functional group or functional polymer group. By fluoro-substituted phenyl group it is meant a phenyl group that includes at least one hydrogen atom replaced with a fluorine atom. By fluoro-substituted methyl group it is meant a methyl group that includes at least one hydrogen atom replaced with a fluorine atom. $R^5$, $R^6$, and $R^7$ may include the fluoro-substituted phenyl group or may consist essentially of the fluoro-substituted phenyl group. $R^5$, $R^6$, and $R^7$ may include the fluoro-substituted methyl group, for example, in the form of a fluoro-substituted methyl group bonded with a sulfuroxide (e.g., sulfoxide, sulfonly, sulfone and the like). The M in the general formula may exist as a metal salt ion or as an integrally bonded part of the formula.

The functional group or functional polymer group may be a Lewis base that forms a complex with the Lewis acid catalyst (e.g., a boron-based Lewis acid catalyst or a metal triflate catalyst). By functional group or functional polymer group it is meant a molecule that contains at least one of the following: an alcohol, an alkylaryl, a linear or branched alkyl having 1-12 carbon atoms, a cycloalkyl, a propyl, a propyl oxide, a mercaptan, an organosilane, an organosiloxane, an oxime, an alkylene group capable of functioning as a covalent bridge to another boron atom, a divalent organosiloxane group capable of functioning as a covalent bridge to another boron atom, and substituted analogs thereof. For example, the functional group or functional polymer group may have the formula (OYH)n, whereas O is O oxygen, H is hydrogen, and Y is H or an alkyl group. However, other known functional polymer groups combinable with a Lewis acid catalyst such as a boron-based Lewis acid catalyst or metal triflate may be used.

According to some embodiments, the Lewis acid catalyst is a boron-based Lewis acid catalyst that has the general formula $B(R^5)_1(R^6)_1(R^7)_1(R^8)_{0 \text{ or } 1}$, whereas $R^5$ and $R^6$ are each independently the fluoro-substituted phenyl group, $R^7$ is the fluoro-substituted phenyl group or the functional group or functional polymer group, optionally $R^8$ is the functional group or functional polymer group.

In some embodiments, the boron-based Lewis acid is tris(pentafluorophenyl)borane.

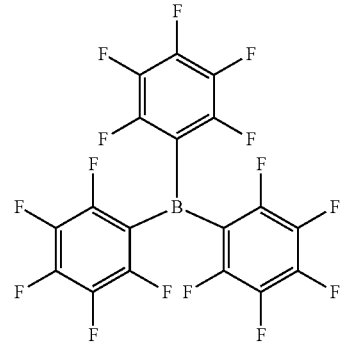 [SMILES: Fc1c(F)c(F)c(B(c2c(F)c(F)c(F)c(F)c2F)c2c(F)c(F)c(F)c(F)c2F)c(F)c1F]

A pentafluorophenylborane complex can have the following structure.

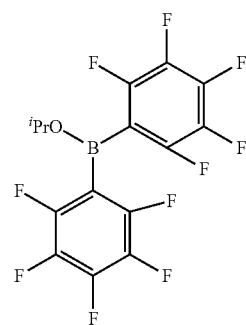 [SMILES: CC(C)OB(c1c(F)c(F)c(F)c(F)c1F)c1c(F)c(F)c(F)c(F)c1F]

The Lewis acid catalyst may be a metal triflate. For example, the metal triflate has the general formula $M(R^5)_1(R^6)_1(R^7)_1(R^8)a$, where a is 0 or 1, whereas M is aluminum, indium, bismuth or erbium, and $R^5$, $R^6$, and $R^7$ are each $CF_3SO_3$. The Lewis acid catalyst may be active at a lower temperature range (e.g., from 60° C. to 110° C.). Exemplary references include U.S. Pat. No. 4,687,755; Williams, D. B. G.; Lawton, M. Aluminium triflate: a remarkable Lewis acid catalyst for the ring opening of epoxides by alcohols. *Org. Biomol. Chem.* 2005, 3, 3269-3272; Khodaei, M. M.; Khosropour, A. R.; Ghozati, K. *Tetrahedron Lett.* 2004, 45, 3525-3529; Dalpozzo, R.; Nardi, M.; Oliverio, M.; Paonessa, R.; Procopio, A. Erbium(III) triflate is a highly efficient catalyst for the synthesis of β-alkoxy alcohols, 1,2-diols and β-hydroxy sulfides by ring opening of epoxides. *Synthesis* 2009, 3433-3438.

The Lewis acid catalyst used in various embodiments may be a blend catalyst that includes one or more Lewis acid catalyst (e.g., each having the general formula $B(R^5)_1(R^6)_1(R^7)_1(R^8)_0$ or $_1$, whereas $R^5$ and $R^6$ are each independently a fluoro-substituted phenyl or methyl group, $R^7$ is a fluoro-substituted phenyl or methyl group or a functional group or functional polymer group, optional $R^8$ is the functional group or functional polymer group). The blend catalyst may optional include other catalysts, in which Lewis acid catalysts having the general formula account for at least 75 wt % of the total weight of the blend catalyst. The added blend catalyst may exclude any DMC based catalysts. Other metal based Lewis acids that are active at lower temperatures may be included as part of the sequential method, the direct method, and/or the blend catalyst. Metal-based Lewis acids are based on one of aluminum, boron, copper, iron, silicon, tin, titanium, zinc, and zirconium.

Starter Compound

The starter compound itself, in both the sequential method and the direct method, is formed using an alkylene oxide such as PO or BO. The starter compound may be a diol or triol. For example, the starter compound is an all PO based diol or triol having a hydroxyl functional based equivalent weight of less than 500 g/mol equivalence. Further, a hydroxyl-containing initiator compound is used with the alkylene oxide to form the starter compound. The hydroxyl-containing initiator compound is any organic compound that is to be alkoxylated in the polymerization reaction. It contains 1 or more hydroxyl groups. It may contain as many as 12 or more hydroxyl groups. Mixtures of initiator compounds can be used. The initiator compound will have a hydroxyl equivalent weight less than that of the polyether product (e.g., may have a hydroxyl equivalent weight of from 30 to 500). Initiator compounds include but are not limited to propylene glycol, dipropylene glycol, tripropylene glycol, 1,4-butane diol, 1,6-hexane diol, 1,8-octane diol, cyclohexane dimethanol, glycerin, trimethylolpropane, trimethylolethane, pentaerythritol, sorbitol and sucrose, as well as alkoxylates (especially ethoxylates and/or propoxylates) of any of these that have a hydroxyl equivalent weight less than that of the product of the polymerization (e.g., up to 500 g/mol equivalence).

Use of Sequential Method:

In embodiments utilizing the sequential method, the starter compounds, described herein, do not proceed directly from the starter compound to a finished polyether polyol composition including a polyether-acetal polyol. For example, the high concentration of hydroxyl groups in the starter compound during early stages of the polymerization inhibits initial catalyst activation, which may result in failure of catalyst induction or in premature deactivation of the catalyst early in the alkoxylation process. Reducing the occurrence of such involves activation of the catalyst at a first temperature and by slowly adding at least one of PO and BO to a mixture including the start compound and the DMC catalyst over a period of 30 minutes or less. Then, the reaction with the DMC catalyst is allowed to proceed. This allows an alkoxylated intermediate to be produced using the DMC catalyst (e.g., and without using any metal based Lewis acid so that only the DMC catalyst is used to form the alkoxylated intermediate). Then, the remainder of the polymerization is performed using the intermediate in the presence of the Lewis acid catalyst with activation at a second temperature that is different from the first temperature and by the additionally adding of at least one of PO and BO to the reaction mixture. However, the present disclosure is not so limited. That is, a direct method, detailed herein, may be utilized without employing DMC catalyst to form the alkoxylated intermediate.

In the sequential method, when the Lewis acid catalyst is added to reaction mixture already having undergone an alkoxylation process in the presence of the DMC catalyst, the temperature of the reactor may be reduced at least 20° C. as compared to when the DMC catalyst was added. According to one or more embodiments, the first temperature of the reactor (in a batch or continuous process) may be at from 125° C. to 160° C. when the DMC catalyst is activated (e.g., during a time at which a PO feed is gradually/slowly added to the reactor and after the time at which the starter compound is mixed with the DMC catalyst). The temperature of the reactor may initially be reduced during the time at which the formation of the intermediate is allowed to proceed, without the addition of any alkylene oxide feed and before the addition of the Lewis acid. The reactor temperature may be at the second temperature of from 25° C. to 115° C. and/or from 60° C. to 115° C. when the Lewis acid is introduced. In one or more embodiments, the control of the relative contribution of a mixture containing an active DMC catalyst and an active Lewis acid may enable the Lewis acid to dominate the addition of oxirane onto chain ends.

In one or more embodiments, when the polyether polyol is derived from PO based starter compound (e.g., a polyoxyalkylene starter compound), at the first temperature PO is added to the mixture and at the second temperature PO or BO is added to the reaction mixture.

The polyether polyol may be prepared using the sequential method in a two-step, one-pot process that uses a DMC catalyst and tris(pentafluorophenyl)borane in such a way that the polyol chain may be rapidly built using the DMC catalyst, and primary hydroxyl groups can be generated at chain ends by the later stage addition of tris(pentafluorophenyl)borane.

Use of Direct Method:

In embodiments utilizing the direct method, the starter compounds proceed directly from the starter compound to a finished polyether polyol composition including a polyether-acetal polyol without employing DMC catalyst to form the alkoxylated intermediate.

That is, the polymerization is performed using the starter compounds in the presence of the Lewis acid catalyst. Notably, in some embodiments, activation at a second temperature associated with the addition of the Lewis acid catalyst is different from a first temperature associated with forming a reaction mixture including the starter compounds without the Lewis acid catalyst.

In the direct method, when the Lewis acid catalyst is added to a reaction mixture including a polyether polyol formed from PO (i.e., epoxypropane) or BO (i.e., 1,2-epoxybutane) and an alkylene oxide selected from the group consisting of epoxypropane, 1,2-epoxybutane and a combination thereof, the temperature of the reactor may be reduced at least 20° C. as compared to when the reaction mixture was prepared. That is, in the direct method, the reaction mixture does not include a DMC catalyst. According to one or more embodiments, the first temperature of the reactor (in a batch or continuous process) may be at from 120° C. to 160° C. when the reaction mixture is prepared (e.g., during a time at which a PO feed is gradually/slowly added to the reactor). The reactor temperature may be at the second temperature of from 25° C. to 115° C. and/or from 60° C. to 115° C. when the Lewis acid is introduced. The polyether polyol may be prepared using the direct method in a two-step, one-pot process that uses a reaction mixture and the subsequent addition of Lewis acid catalyst in such a way that the polyol chain may be rapidly built using the Lewis acid catalyst.

In either the direct or sequential method, the polymerization reaction can be performed in any type of vessel that is suitable for the pressures and temperatures encountered. In a continuous or semi-continuous process the vessel may have one or more inlets through which the alkylene oxide and starter compound(s) may be introduced during the reaction. In a continuous process employing the sequential method, the reactor vessel should contain at least one outlet through which a portion of the partially polymerized reaction mixture may be withdrawn. A tubular reactor that has single or multiple points for injecting the starting materials, a loop reactor, and a continuous stirred tank reactor (CSTR) are all suitable types of vessels for continuous or semi-continuous operations. An exemplary process is discussed in U.S. Patent Publication No. 2011/0105802.

The resultant polyether polyol product obtained in any of the foregoing direct or sequential methods may be further treated, for example, in a flashing process and/or stripping process. For example, the polyether polyol may be treated to reduce catalyst residues even though the catalyst residue may be retained in the product. Moisture may be removed by stripping the polyol. The polyoxyalkylene polyol, according to embodiments, may have a DMC catalyst concentration (in ppm in the final polyoxyalkylene polyol) of from 15 ppm to 100 ppm (e.g., 35 ppm to 100 ppm, 50 ppm to 75 ppm, etc.). The polyoxyalkylene polyol, according to embodiments, may have a Lewis acid catalyst concentration (in ppm in the final polyoxyalkylene polyol) of from 100-500 ppm (e.g., 100 ppm to 250 ppm).

The polymerization reaction can be characterized by the "build ratio", which is defined as the ratio of the Mn of the polyether product to that of the initiator compound. This build ratio may be as high as 160, but is more commonly in the range of from 2.5 to about 65 and still more commonly in the range of from 2.5 to about 50. The build ratio is typically in the range of from about 2.5 to about 15, or from about 7 to about 11 when the polyether product has a hydroxyl equivalent weight of from 85 to 400.

Embodiments relate to a catalytic method for high primary hydroxyl content (e.g., at least 60% and/or approximately 70%) and high molecular weight polyols (e.g., PO polyols). In one or more embodiments, the one-pot sequential method involves the use of the DMC catalyst and tris(pentafluorophenyl)borane (FAB) in a sequential manner. In particular, by performing the DMC catalyzed reaction and the FAB catalyzed reaction at temperatures greater than 130° C. and less than 110° C., respectively, the FAB catalyst may be utilized for regioselectivity the formation of primary hydroxyl groups in the presence of DMC catalyst. This method can be used to rapidly synthesize high molecular weight products from low molecular weight initiators.

Polyol compositions including the polyether-acetal polyols produced in accordance with the sequential or direct methods herein may be useful for making polyurethane formulations, which when cured, can form polyurethanes such as those used in making elastomeric or semi-elastomeric polyurethane products, including noncellular or microcellular elastomers, coatings, adhesives, sealants, and flexible, rigid, and viscoelastic polyurethane foams. The flexible polyurethane foams may be made in a slabstock or molding process. In one or more embodiments, a polyurethane is formed by curing any one of the polyurethane formulations that includes a polyol composition including a polyether-acetal polyol.

In various embodiments, the polyether-acetal polyol is 1 percent to 97.9 percent of a total weight of the polyurethane (i.e., of the resultant polyurethane). All individual values and subranges from 1 wt % to 97.9 wt % of a total weight of the polyurethane are included; for example, the percentage of the polyether-acetal polyol can have from a lower limit of 1 wt %, 10 wt %, 23 wt % or 37 wt % to an upper limit of 97.9 wt %, 75 wt %, 37 wt %, or 29 wt % of the total weight of the polyether-acetal polyol.

In one or more embodiments, the polyurethane formed is a high modulus polyurethane having a modulus greater than 700 pounds per square inch (psi) as measured according to ASTM D1708. For example, the polyurethane can be a high modulus polyurethane formed from a polyurethane composition including a chain extender such as 1, 4-butandiol, among other suitable chain extenders. In one or more embodiments, the polyurethane can be a high modulus polyurethane having a modulus greater than 800 pounds per square inch (psi) as measured according to ASTM D1708. In some embodiments, the polyurethane is a high modulus polyurethane having a modulus greater than 1000 pounds per square inch (psi) as measured according to ASTM D1708.

All parts and percentages are by weight unless otherwise indicated.

EXAMPLES

Analytical Methods:

Gel Permeation Chromatography (GPC): GPC analysis for determination of number average molecular weight (Mn) and acetal content (i.e., the portion of the polyether-acetal polyol that is functionalized with the at least one acetal functional group) is carried out at a flow rate of 1.0 milliliter/minute using four PLgel organic GPC columns connected in series (3 μm, Agilent Inc.) and tetrahydrofuran as eluent. The column temperature is 40° C. VORANOL™ CP 6001, VORANOL™ 210, 230-660, and 230-056N are used as internal standards. The GPC system consisted of a binary pump module (Waters Inc. 1525), an autosampler (Waters Inc. 2707) and a refractive index detector (Waters Inc. 2414).

$^{13}$C-NMR Analysis: Samples were prepared by adding approximately 10 wt % deuterated solvent such as dimethylsulfoxide (DMSO) or acetone (in case of BO polyols). Data was collected using a Bruker 400 Megahertz spectrometer equipped with a Bruker Dual DUL high-temperature CryoProbe. Data was acquired using 64 transients per data file, a 30 sec relaxation delay, 90 degree flip angles, and inverse gated decoupling at room temperature. All measurements were made on non-spinning samples in locked mode. The acquisition was carried out using spectral width of 25000 hertz and a file size of 65K data points.

Acetal content of polyol compositions including a polyolacetal polyol and polyurethanes formed therefrom is by a combination of GPC analysis and $^{13}$C NMR. For example, an acetal content is determined by the ratio of the area under the GPC peaks corresponding to the higher molecular weight fraction to the total area under the GPC curve. The presence of acetal linkages in the higher molecular weight fraction was confirmed by GPC analysis of the acid-finished product, as described herein. Additionally, acetal functionality was verified by $^{13}$C NMR analysis and appeared in the spectrum from 95-110 ppm. In contrast to other approaches, the acetal linkages of the polyol-acetal polyol, as described herein, are formed in concurrence with the formation of the polyether polyol comprising the polyol compositions including the polyol-acetal polyol so polyol compositions including the polyol-acetal polyol are comparatively more tolerant of changes in pH, among other advantage.

Determination of Primary Hydroxyl and Secondary Hydroxyl Groups (Selectivity):

Selectivity of ring opening is determined by trifluoroacetylation followed by $^{19}$F-NMR analysis. Sample preparation is carried out using the procedure described in ASTM D 4273-94. As stated in the ASTM method, derivatization requires knowledge of OH# or the molecular weight (MW) and functionality of the polyol as it decides the amount of Trifluoroacetic anhydride (TFAA) used for derivatization of the polyol. It is necessary to add sufficient amount of TFAA to ensure completion of derivatization reaction.

OH# can be calculated as =33×% OH, with % OH=1700/hydroxyl equivalent weight of the polyol.

Hydroxyl equivalent weight of the polyol=MW of the polyol/functionality. The ASTM method gives the following suggestion for amount of TFAA to be added to the reaction based on hydroxyl number.

| hydroxyl number | volume of TFAA |
|---|---|
| 24 to 75 | 1 milliliter |
| 76 to 150 | 2 milliliter |
| 151 to 225 | 3 milliliter |
| 226 to 300 | 4 milliliter |

$^{19}$F-NMR Analyses: $^{19}$F-NMR spectra is acquired using a Bruker Avance III 400 megahertz spectrometer. The data is acquired using 64 transient scans per data file, a 3 second pulse repetition delay, spectral width of 93,750 hertz, and a file size of 13,000 data points. The relaxation delay is verified to be adequate using a saturation recovery experiment. Spectra are acquired using α,α,α-trifluro-toluene as an internal chemical shift standard at 0.1 wt % in chloroform-d (CDCl3).

Determination of Mechanical Properties: mechanical properties including tensile strength (%), elongation (%), and modulus (pounds per square inch) are determined in accordance with ASTM D1708 for polyurethanes formed by curing polyurethane formulations including a polyisocyanate (e.g., polyurethane formulations having an isocyanate index in a range from 70 to 500) and the respective polyols of the Working Examples 1-5 and Comparative Examples 1-D.

Acid Finishing: Removal of acetal linkages was carried out to effectuate a difference between measured GPC values of polyols before and after acid finishing of polyols with acid. The acid finishing was performed using the following method: a 1.0 liter (L) 3-neck flask was fitted with a reflux condenser and thermocouple and placed under an inert nitrogen atmosphere. The flask was charged with the polyoxyalkylene diol prepared in Working Example 6 (100 g) and acid (300 mL of methanol as Dowex 50wx4 (0.5 g)) to form a mixture thereof. The mixture was mechanically agitated and heated to 65° C. for approximately 3 hours. Upon cooling to ambient temperature of about 23° C., the reaction mixture was filtered and concentrated in vacuo. The acid finishing removed all acetal linkages from samples including polyether-acetal polyol as confirmed by GPC and $^{13}$C-NMR spectroscopy readings of the samples following the acid finishing.

Viscosity Analysis: viscosity was calculated as a dynamic viscosity using a Brookfield DV-II+ Pro EXTRA Viscometer at approximately 38° C. as controlled by a Thermosel temperature controller in accordance with Brookfield viscosity test and ASTM D2196. For example, a polyol (50 grams (g) of a polyol), an isocyanate (PAPI94, a polymeric methylene diphenyl diisocyanate with an isocyanate equivalent weight of approximately 131), and a catalyst (Dabco® 33-LV, a 33 weight % solution of triethylenediamine in dipropylene glycol available from Sigma-Aldrich®)) formed a mixture. An amount of the catalyst in the mixture was varied from 10 microliters (uL) to 20 uL for each Example based on an intended duration of reaction. Typical intended durations of reaction are from 15 minutes up to 120 minutes, but are not limited to this range. Spindle speed of a Wells/Brookfield cone spindle (CPE-51) was varied such as to keep the shear rate within the recommended range of the Brookfield viscosity method and ASTM D2196. An amount of isocyanate (i.e., PAPI94) (as calculated using Equation 1) was added to the mixture to achieve a desired index of 1.05 and the mixture was mixed for 30 seconds at approximately 1250 rotations per minute. Viscosity data was collected was taken every 10 seconds following 2 minutes of stabilization. The viscosity measurements are reported in units of centipoise (cP).

Volume of PAPI94 (mL)=(weight of polyol×equivalent weight of PAPI94×desired index)/(56100×1.213)   Equation 1:

The following materials are principally used:

| | |
|---|---|
| Starter Compound 1 | A polyoxypropylene triol having a Mn of approximately 700 g/mole (available from The Dow Chemical Company as VORANOL ™ 270) formed from epoxypropane. |
| Starter Compound 2 | A polyoxyalkylene diol having a Mn of approximately 2000 g/mole (available from The Dow Chemical Company as VORAPEL ™ D3201) formed from propylene oxide and butylene oxide. |
| Starter Compound 3 | A polyoxyalkylene triol having a Mn of approximately 3500 g/mole (available from The Dow Chemical Company as VORANOL ™ 3512A) formed from ethylene oxide and propylene oxide. |
| DMC Catalyst | A zinc hexacyanocobaltate catalyst complex (available from Bayer Material Scince, Inc. under the name Arcol 3 ® Catalyst). |
| FAB | Tris(pentafluorophenyl)borane (available from Boulder Scientific). |
| Additive | An acidifying agent that includes phosphoric acid. |

Working Examples 1 to 6 and Comparative Examples A to E are prepared using the above materials according to the conditions outlined in Table 1, below. Referring to Table 1, the Mn is as determined by gel permeation chromatography (GPC), as discussed above. With continued reference to Table 1, the DMC and FAB amounts are listed as parts per million (ppm) by weight of a final polyoxyalkylene polyol (PO triol or PO diol) that has been stripped of moisture. Referring to Table 2, the acetal content % is determined by GPC, as discussed above. With continued reference to Table 2, the mechanical properties including tensile strength, elongation, and modulus are determined in accordance with ASTM D1708, while the primary hydroxyl group content (i.e., Primary OH) is determined by derivatization using trifluoroacetic anhydride followed by $^{19}$F-NMR), as discussed above.

TABLE 1

| | Polyether-acetal polyol | Alkylene oxide | DMC (ppm) | First Temp (° C.) | FAB (ppm) | Second Temp (° C.) |
|---|---|---|---|---|---|---|
| | | | 4500 MW Triol | | | |
| Ex. 1 (Sequential) | Triol | PO | 75 | 130 | 250 | 110 |
| Ex. 2 (Sequential) | Triol | PO | 75 | 130 | 250 | 60 |
| CE. A | Triol | PO | 75 | 130 | — | — |
| | | | 1650 MW Triol | | | |
| Ex. 3 (Direct FAB) | Triol | PO | — | — | 250 | 110 |
| Ex. 4 (Direct FAB) | Triol | PO | — | — | 250 | 60 |
| CE. B | Triol | PO | 75 | 130 | — | — |
| | | | 2200 MW Diol | | | |
| Ex. 5 (Direct FAB) | Diol | BO | — | — | 258 | 110 |
| CE. C | Diol | BO | — | — | — | — |
| CE. D | Diol | BO | — | — | 250 | 110 | tion of FAB is 20 degrees less than the first temperature for the addition of the DMC Catalyst. In particular, Working Example 1 is prepared using the following method: a 500 milliliter (mL) pressure reactor is charged with the Starter Compound 1 (50 g), the Additive (1.3 μL of a 0.15 M solution), and the DMC Catalyst (0.024 g). The mixture is dried by heating the reactor to 130° C. for 2 hours under a nitrogen sparge. Upon blocking nitrogen flow and closing the vent, PO is slowly added to the reactor as a PO feed. The DMC Catalyst is activated in approximately 20-30 minutes, during which the PO feed is gradually increased to 2.0-2.5 mL/minute. Upon addition of approximately 240 mL of additional PO using the PO feed, the feed is blocked and the reaction is allowed to continue for 15 minutes and cooled to 60° C. Thereafter, the FAB (0.080 g) is added as one portion and the reactor is heated to 110° C. The PO feed is resumed at a rate of approximately 0.3-0.6 mL/minute. Upon addition of approximately 91 mL of PO, the reaction is allowed to digest for 30 minutes, and purged with nitrogen for 45 minutes. The polyol composition including a polyether-acetal polyol (306 g, 95%) of Working Example 1 was collected after the reaction cooled to ambient temperature of approximately 23° C. The polyol composition including the polyether-acetal polyol had a Mn of 4145 as confirmed by GPC and a primary hydroxyl content of 69% as confirmed by F-NMR (i.e., derivatization using trifluoroacetic anhydride followed by $^{19}$F-NMR of 69%).

TABLE 2

| | Mn | Acetal content (%) | Primary OH (%) | Tensile strength (psi) | Elongation (%) | Modulus (psi) |
|---|---|---|---|---|---|---|
| Ex. 1 (Sequential) | 4600 | 37 +/− 1 | 67 +/− 1 | 509 +/− 30 | 135 +/− 13 | 769 +/− 31 |
| Ex. 2 (Sequential) | 5302 | 29 +/− 1 | 68 +/− 1 | 435 +/− 29 | 148 +/− 12 | 779 +/− 17 |
| CE. A | 4494 | — | 9 +/− 1 | 475 +/− 21 | 187 +/− 7 | 663 +/− 18 |
| Ex. 3 (Direct) | 1693 | 23 +/− 1 | 71 +/− 1 | 913 +/− 66 | 219 +/− 12 | 888 +/− 11 |
| Ex. 4 (Direct) | 1791 | 30 +/− 1 | 68 +/− 1 | 629 +/− 73 | 173 +/− 20 | 807 +/− 58 |
| CE. B | 2050 | — | 9 +/− 1 | 611 +/− 25 | 162 +/− 8 | 823 +/− 33 |
| Ex. 5 (Direct FAB) | 2008 | 6 +/− 1 | 57 +/− 1 | 1230 +/− 38 | 608 +/− 36 | 1042 +/− 12 |
| CE. C | 2280 | — | 5 +/− 1 | 633 +/− 14 | 524 +/− 42 | 659 +/− 63 |
| CE. D | 2148 | — | 57 +/− 1 | 1009 +/− 70 | 539 +/− 54 | 854 +/− 30 |

Working Example 1 is a polyol composition including a polyether-acetal polyol prepared using the Starter Compound 1 (i.e., a propoxylated triol having a molecular weight of approximately 700 g/mole) and the sequential dual catalyst process, in which the second temperature for the addi- For example, with respect to Working Example 1 and Working Example 2, as detailed herein, the following reaction may be carried out wherein R1, R2, R3 and R4=Me (methyl):

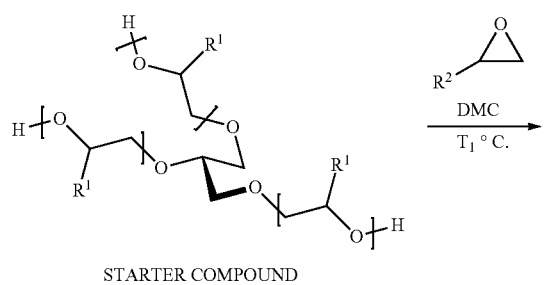

STARTER COMPOUND

-continued

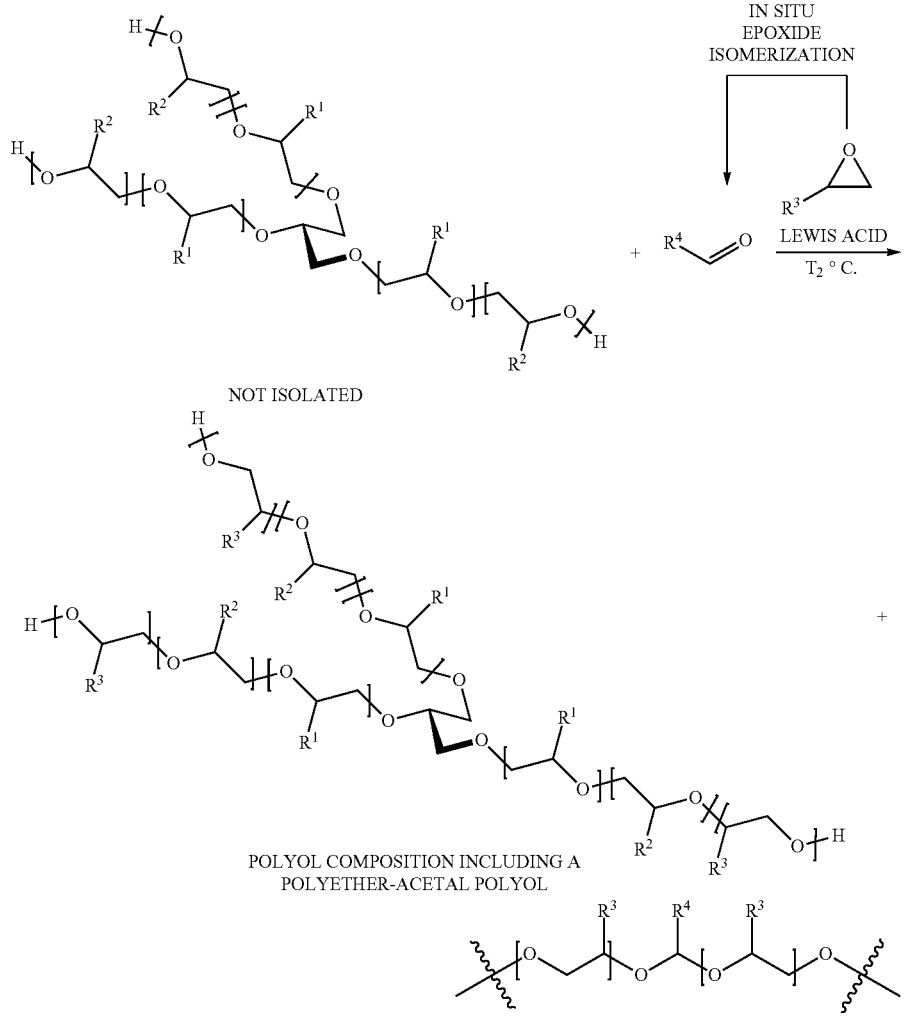

POLYOL COMPOSITION INCLUDING A
POLYETHER-ACETAL POLYOL

Working Example 2 is a polyol composition including a polyether-acetal polyol prepared using the Starter Compound 1 and the sequential dual catalyst process, in which the second temperature for the addition of FAB is 70 degrees less than the first temperature for the addition of the DMC Catalyst. In particular, Working Example 2 is prepared using the same method as discussed above with respect to Working Example 1, except after the FAB is added the reactor is maintained at 60° C. The polyol composition including a polyether-acetal polyol of Working Example 2 (314 g, 98%) was collected after the reaction cooled to ambient temperature of approximately 23° C. The polyol composition including a polyether-acetal polyol had a Mn of 4494 as confirmed by GPC and a primary hydroxyl content of 68% as confirmed by F-NMR.

Comparative Example A (i.e., CE. A) is polyoxypropylene triol prepared using the Starter Compound 1 (i.e., a propoxylated triol having a molecular weight of approximately 700 g/mole) and a DMC catalyst without employing FAB during formation of the polyoxypropylene triol and does not produce a polyol composition including a polyether-acetal polyol. In particular, Comparative Example A is prepared using the following method: a 500 mL pressure reactor is charged with the Starter Compound 1 (50 g), the Additive (1.3 µL of a 0.15 M solution), and the DMC Catalyst (0.024 g). The mixture is dried by heating to the reactor to 130° C. for 2 hours under a nitrogen sparge. Upon blocking nitrogen flow and closing the vent, PO was slowly added to the reactor as PO feed until the pressure reached 20 psi. Then, the PO feed is turned off and the reaction is allowed to continue until over a period of 11 minutes and the pressure reaches 8.9 psi. The catalyst is considered "activated" at this time and the PO feed is resumed and gradually increased to 2.0-2.5 mL/minute. Upon addition of approximately 330 mL of additional PO using the PO feed, the feed is blocked and the reaction is allowed to continue for 30 minutes and purged with nitrogen for an additional 30 minutes at 130° C. The polyoxypropylene triol is deemed formed when the 30 minutes have elapsed. Following formation of the polyoxypropylene triol, the reactor is cooled to 70° C. and the FAB (0.080 g) is added as one portion and the reactor is stirred for 30 minutes to homogenize the catalyst. The polyoxypropylene triol had a Mn of 4661 as confirmed by GPC.

Working Example 3 is a polyol composition including a polyether-acetal polyol prepared using the Starter Compound 1 and the direct method. A 500 mL pressure reactor is charged with the Starter Compound 1 (50 g), Additive (1.3 µL of a 0.15 M solution), and the DMC Catalyst (0.024 g). The mixture is dried by heating the reactor to 130° C. for 2 hours under a nitrogen sparge. Upon blocking nitrogen flow and closing the vent, PO is slowly added to the reactor. The DMC catalyst is activated in approximately 20 to 30 minutes upon which PO feed is gradually increased to 2.0-2.5 mL/minute. Upon addition of approximately 239 mL of PO, the feeds are blocked and the reaction is allowed to continue for 15 minutes. Then, the reactor is cooled to 60° C. and the FAB (0.080 g) is added in one portion and the reactor is heated to 110° C. The PO feed is resumed at rate of 0.3-0.6 mL/minute. Upon addition of approximately 91 mL of additional PO, the reaction is allowed to continue for 30 minutes and purged with nitrogen for 45 minutes. The polyol composition including a polyether-acetal polyol of Working Example 3 (306 g, 95%) was collected after the reaction cooled to ambient temperature of approximately 23° C. The polyol composition including a polyether-acetal polyol had a Mn of 4145 as confirmed by GPC and a primary hydroxyl content of 69% as confirmed by F-NMR.

Working Example 4 is a polyol composition including a polyether-acetal polyol prepared using the Starter Compound 1 and the direct method. In particular, Working Example 4 is prepared using a similar method as discussed, above, with respect to Working Example 3, except after the FAB is added the reactor remains at 60° C. during the addition of PO. The polyol composition including a polyether-acetal polyol of Working Example 4 (314 g, 98%) was collected after the reaction cooled to ambient temperature of approximately 23° C. The polyol composition including a polyether-acetal polyol had a Mn of 4494 as confirmed by GPC and a primary hydroxyl content of 68% as confirmed by F-NMR.

For example, with respect to Working Example 1 and Working Example 2, as detailed herein, the following reaction may be carried out wherein R1, R2, R3 and R4=Me (methyl):

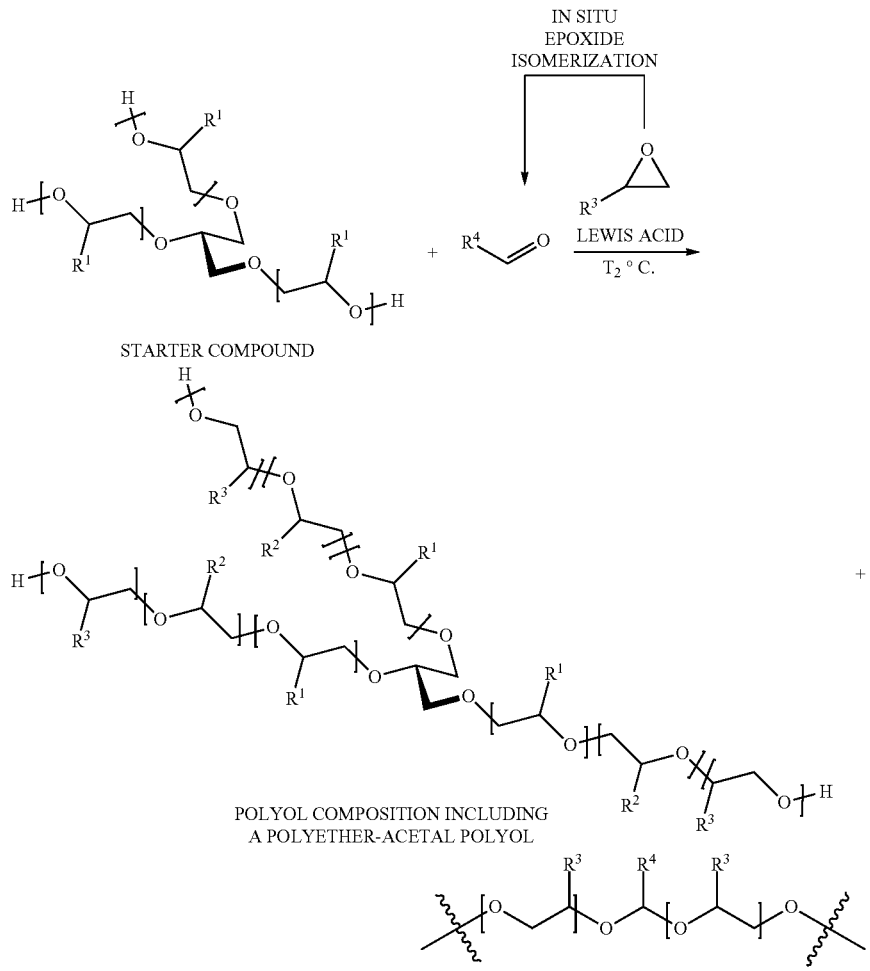

Comparative Example B is a polyoxypropylene triol prepared using the Starter Compound 1 and a DMC Catalyst process but without employing FAB during formation of the polyoxypropylene triol and does not produce a polyol composition including a polyether-acetal polyol. A 1 L pressure reactor is charged with Starter Compound 1 (320 g), Additive (1.5 μL of a 0.15 M solution) and the DMC catalyst (0.056 g). The mixture is dried by heating the reactor to 140° C. for 2 hours under a nitrogen sparge. Upon blocking nitrogen flow and closing the vent, PO was slowly added to the reactor at 130° C. The DMC catalyst was activated in approximately 33 minutes following which PO feed was gradually increased to approximately 1.5-2.0 mL/minutes. Upon addition of approximately 523 mL of PO, the feeds were blocked and the reaction was allowed to digest for 30 minutes. The reactor was vented to the scrubber purged with nitrogen while the contents cooled down to ambient temperature of approximately 23° C. The polyoxypropylene triol had a Mn of 1693 as confirmed by GPC. Following formation of the polyoxypropylene triol, the reactor is cooled to 70° C. and the FAB (0.080 g) is added as one portion and the reactor is stirred for 30 minutes to homogenize the catalyst. The polyoxypropylene triol had a Mn of 4661 as confirmed by GPC.

Working Example 5 is polyol composition including a polyether-acetal polyol prepared using the Starter Compound 2 (i.e., a butoxylated diol) and the direct method. In particular, Working Example 5 is prepared using the following method: a 1.0 L pressure reactor was charged with Starter Compound 2 (500 g) in the presence of a nitrogen purge. The reactor was heated at 110° C. for 3 hours. An additional charge of 100 g of dry Starter Compound 2 containing FAB (0.19 g) was added to the reactor using a pressure cylinder. The additional charge was prepared by adding FAB (0.19 g) to a round bottom flask containing 105 g of dry Starter Compound 2 and heating the flask at 100° C. for 30 minutes under a vacuum of 85 millibars (mb) and a nitrogen purge. Upon blocking nitrogen flow and closing the vent to the pressure reactor, BO was slowly added to the reactor as a BO feed at 110° C. and a constant feed rate of 0.4 mL/minute. The pressure in the reactor slowly trended up to 26.7 pounds per square inch gage (psig) over the course of addition of approximately 209 mL of BO. Upon blocking feeds, the reaction was allowed to digest for approximately 30 minutes. The reactor was vented to a scrubber and purged with nitrogen for approximately 45 minutes. The polyol composition including a polyether-acetal polyol of Working Example 5 (719 g, 93%) was collected after the reaction cooled to ambient temperature of approximately 23° C. The polyol composition including a polyether-acetal polyol had a Mn of 2208 as confirmed by GPC and a primary hydroxyl content of 57% as confirmed by F-NMR.

Comparative Example C is polyoxyalkylene diol that is commercially available as VORAPEL™ D3201 from The Dow Chemical Company. The polyoxypropylene diol had a Mn of 2080 as confirmed by GPC.

Comparative Example D is a polyoxyalkylene diol prepared using the Starter Compound 2, the DMC Catalyst, and FAB during formation of the polyoxyalkylene diol and does not produce a polyol composition including a polyether-acetal polyol. Notably, the polyoxyalkylene diol product is acid finished, as described herein, and does not contain acetal linkages. In particular, Comparative Example D is prepared using the following method: a 1.0 L pressure reactor was charged with Starter Compound 2 (400 g) in the presence of a nitrogen purge. The reactor was heated at 110° C. for 3 hours. An additional charge of approximately 202 g of dry Starter Compound 2 containing FAB (0.19 g) was added to the reactor using a pressure cylinder. This additional charge was prepared by adding FAB (0.19 g) to a round bottom flask containing 205 g of dry Vorapel D3201™ and heating the flask at 100° C. for 30 minutes under a vacuum of 85 mb and a slow purge of nitrogen. Upon blocking nitrogen flow to the pressure reactor and closing the vent, BO was slowly added to the reactor at 110° C. and a constant feed rate of 0.4 mL/minute. The pressure in the reactor slowly trended up to 26.7 psig over the course of addition of approximately 209 mL of BO. Upon blocking feeds, the reaction was allowed to digest for 30 minutes. The reactor was vented to the scrubber purged with nitrogen for 45 minutes. The product of this reaction was acid finished, as described herein. The resultant acid finished p polyoxyalkylene diol had a Mn of 2148 as confirmed by GPC.

Working Example 6 is polyol composition including a polyether-acetal polyol prepared using the Starter Compound 3 and the FAB catalyst. In particular Working Example 6 is prepared using the following method: a 8.0 L pressure reactor was charged with Starter Compound 3 (1800 g) in the presence of a nitrogen purge. The reactor was heated at 110° C. for 5 hours. An additional charge of approximately 200 g of dry Starter Compound 3 containing FAB (3.35 g) was added to the reactor using a pressure cylinder. This additional charge was prepared by adding FAB to a round bottom flask containing approximately 205 g of dry Starter Compound 3 and heating the flask at 100° C. for approximately 30 minutes under a vacuum of 85 mb and a nitrogen purge. Upon blocking nitrogen flow to the pressure reactor and closing the vent, PO was slowly added to the reactor at 110° C. and a constant feed rate of approximately 2.0 mL/minute. The pressure in the reactor slowly trended up to 15.4 psig over the course of addition of approximately 1016 mL of PO. Upon blocking feeds, the reaction was allowed to digest for 30 minutes. The reactor was vented to a scrubber and purged with nitrogen for 45 minutes. The polyol composition including a polyether-acetal polyol had 38% acetal content as measured by GPC and 69% primary hydroxyl content as measured by F-NMR analysis.

Comparative Example E is a polyoxyalkylene triol prepared using the Starter Compound 3 and the FAB catalyst prepared using the method of Working Example 6 with the addition of acid finishing, as detailed herein, to remove all acetal content from the prepared diol. The acid finished product was a polyoxyalkylene triol having 0.0% acetal content as measured by GPC and 68% primary hydroxyl content as measured by F-NMR analysis.

FIG. 1 illustrates Gel Permeation Chromatography (GPC) traces according to the disclosure. As shown in FIG. 1, the relative intensity of Working Example 6 having 38.0% acetal content is greater (i.e., peaks more quickly) than the relative intensity of Comparative Example E that has 0.0% acetal content. As used herein, the relative intensity is a ratio of a measured value of intensity (as reported in refractive index units) to a theoretical maximum value for the particular medium of interest. Notably, the primary hydroxyl content of Comparative Example E and Working Example 6 are equivalent and thus the enhanced relative intensity of Working Example 6 is attributed to its acetal content.

Figure 2:
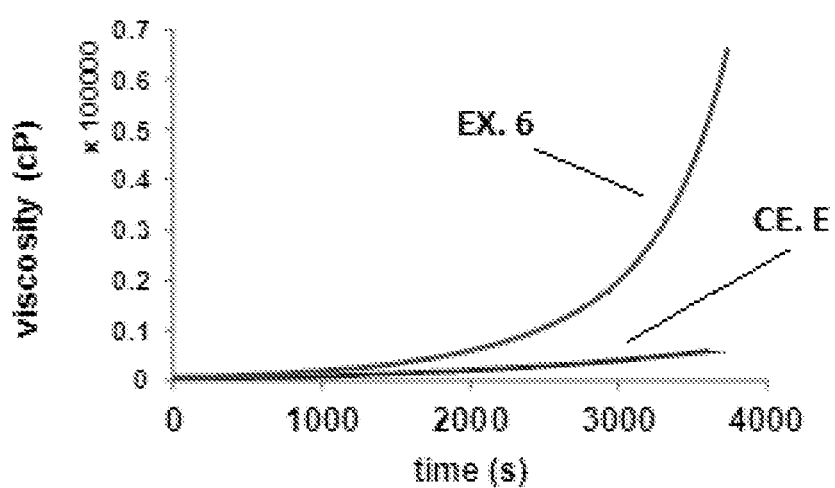
FIG. 2 illustrates Brookfield viscosity plots of the GPC traces of FIG. 1.

FIG. 2 illustrates Brookfield viscosity plots of the GPC traces of FIG. 1. As shown in FIG. 2, the viscosity of the Working Example 6 having 38% acetal content is greater (i.e., rises quicker and to a higher final value) than the viscosity of Working Example 6 that has 0.0% acetal content. Put another way, Working Example 6 realizes a significantly faster gelation time due to its acetal content.

As is illustrated by Working Examples 1-5, polyether-acetal polyols with an acetal content (i.e., the portion of the polyether-acetal polyol that is functionalized with the at least one acetal functional group) lead to a desired increase in modulus of polyurethanes formed from the same as compared to polyurethanes formed from polyether polyols without any acetal content (Comparative Examples A-D). That is, while the relative molecular weight of a polyol can influence a resultant modulus of a polyurethane formed from the same, polyether-acetal polyols with an acetal content facilitate an improved (i.e., greater) modulus as compared to polyether polyols without any acetal content of the same molecular weight.

For instance, the polyurethanes formed from the polyol compositions including the polyether-acetal triols of Working Examples 1 and 2 have improved modulus (769+/−31 and 779+/−17 psi, respectively) as compared to the modulus values (663+/−18 psi) of the polyurethane formed from the polyether triol without any acetal content of Comparative Example A. The polyurethane formed from the polyol compositions including the polyether-acetal triol of Working Examples 3 has improved modulus values (888+/−11 psi) as compared to the modulus value (823+/−33 psi) of the polyurethane formed from the polyether triol without any acetal content of Comparative Example B. Similarly, the polyurethane formed from the polyol composition including the polyether-acetal diol of Working Example 5 has improved modulus values (1042+/−12 psi) as compared to the modulus value (659+/−63 and 854+/−30 psi) of the polyurethanes formed from the polyether diols without any acetal content of Comparative Examples C and D, respectively. Notably, such increases in modulus were realized while maintaining similar values of mechanical properties such as tensile strength and elongation in both the polyurethanes prepared using polyol compositions including the polyether-acetal polyols and those prepared using the polyether polyols without any acetal content.

Moreover, Working Examples formed using the direct method at a lower temperatures (i.e., Example 4 at 60° C.) surprisingly experienced an increase in acetal content as compared to Working Examples formed using the FAB method at higher temperatures (Working Example 3 at 110° C.). One of ordinary skill in the art would have expected decreasing a temperature associated with the introduction of FAB to lead to a decrease in acetal content, as is shown in Working Examples 1 and 2 where a decrease in the second temperature rom 110° C. to 60° C. leads to a decrease in acetal content from 37% to 29%, respectively. Advantageously, decreasing temperature and using the direct method can desirably and unexpectedly lead to an increase in an acetal content of a polyether-acetal polyol. As detailed with respect to Working Example 6 and Comparative Example E, a polyether-acetal polyol can desirably have a higher relative intensity and/or a quicker gelation time as compared to a polyether polyol without acetal content.

What is claimed:

1. A polyurethane formulation, comprising:
   a polyol composition including a polyether-acetal polyol functionalized with at least one acetal functional group, where the polyol composition has an average hydroxyl functionality from 2 to 8 and a hydroxyl equivalent weight from 150 to 4000, where the portion of the polyether-acetal polyol that is functionalized with the at least one acetal functional group is 1 percent to 40 percent of a total weight of the polyether-acetal polyol, where the polyether-acetal polyol has a primary hydroxyl group content of at least 55 percent; and
   a polyisocyanate, where the polyurethane formulation has an isocyanate index in a range from 70 to 500; and where the polyurethane formulation when cured forms a high modulus polyurethane having a modulus greater than 800 pounds per square inch (psi) as measured according to ASTM D1708.

2. The polyurethane formulation of claim 1, where the polyether-acetal polyol is from 1 percent to 100 percent of a total weight of the polyol composition.

3. A polyurethane formed by curing the polyurethane formulation of claim 1, where the polyether-acetal polyol is 1 percent to 97.9 percent of a total weight of the polyurethane, and where the polyurethane is a high modulus polyurethane having a modulus greater than 800 pounds per square inch (psi) as measured according to ASTM D1708.

4. A method for forming a polyurethane formulation, comprising:
   preparing a reaction mixture that includes:
      a polyether polyol formed from epoxypropane or 1,2-epoxybutane; and
      an alkylene oxide selected from the group consisting of epoxypropane, 1,2-epoxybutane and a combination thereof;
   adding a Lewis acid catalyst to the reaction mixture, the Lewis acid catalyst having the general formula $M(R^5)_1(R^6)_1(R^7)_1(R^8)_a$, where M is boron, aluminum, indium, bismuth or erbium, a is 0 or 1, $R^5$ and $R^6$ are each independently select from the group consisting of a fluoro-substituted phenyl or a methyl group, $R^7$ is selected from the group consisting of a fluoro-substituted phenyl, a methyl group, a functional group and a functional polymer group, and when a is 1 $R^8$ is selected from the group consisting of a functional group or functional polymer group;
   adding an additional amount of epoxypropane or 1,2-epoxybutane to the reaction mixture including the Lewis acid catalyst to form a polyol composition including a polyether-acetal polyol functionalized with at least one acetal functional group, where the polyol composition has an average hydroxyl functionality from 2 to 8 and a hydroxyl equivalent weight from 150 to 4000, where the portion of the polyether-acetal polyol that is functionalized with the at least one acetal functional group is 1 percent to 40 percent of a total weight of the polyether-acetal polyol, where the polyether-acetal polyol has a primary hydroxyl group content of at least 55 percent; and
   combining the polyol composition with a polyisocyanate to form a polyurethane formulation, where the polyurethane formulation has an isocyanate index in a range from 70 to 500 and where the polyurethane formulation when cured forms a high modulus polyurethane having a modulus greater than 800 pounds per square inch (psi) as measured according to ASTM D1708.

5. The method of claim 4, where the Lewis acid catalyst having the general formula $M(R^5)_1(R^6)_1(R^7)_1(R^8)_a$, M is boron and $R^5$ and $R^6$ are each independently the fluoro-substituted phenyl group.

6. The method of claim 5, where the Lewis acid catalyst is tris(pentafluorophenyl)borane or a pentafluorophenylborane based catalyst complex with the functional group or functional polymer group.

7. The method of claim 4, where the reaction mixture includes a double-metal cyanide (DMC) catalyst added and used as a polymerization catalyst before any of the Lewis-acid catalyst is added to the reaction mixture such that the DMC catalyst and the Lewis acid catalyst are added separately.

8. The method of claim 4, where the reaction mixture does not include a double-metal cyanide (DMC) catalyst.

9. The method of claim 8, including changing a temperature of a reactor housing the reaction mixture from a first temperature associated with preparing the reaction mixture to a second temperature when adding the Lewis acid catalyst to the reaction mixture, where the first temperature is 120° C. to 160° C. and the second temperature is 60° C. to 115° C.

* * * * *